United States Patent
Mueller et al.

[11] Patent Number: 5,993,189
[45] Date of Patent: Nov. 30, 1999

[54] APPARATUS FOR MOLDING MICROSYSTEM STRUCTURES

[75] Inventors: Lutz Mueller, Jena; Frank Reuther, Rudolstadt; Alf Springer, Milda; Matthias Heckele, Linkenheim; Hans Biedermann, Bruchsal, all of Germany

[73] Assignee: Jenoptik Aktiengesellschaft, Jena, Germany

[21] Appl. No.: 08/954,714

[22] Filed: Oct. 20, 1997

[30] Foreign Application Priority Data

Nov. 26, 1996 [DE] Germany ............... 196 48 844

[51] Int. Cl.⁶ ............................................. B29C 43/56
[52] U.S. Cl. ................. 425/405.1; 425/385; 425/812; 425/DIG. 60
[58] Field of Search ................. 425/405.1, 546, 425/812, 73, 385, DIG. 60

[56] References Cited

U.S. PATENT DOCUMENTS

| | | | |
|---|---|---|---|
| 3,543,336 | 12/1970 | Feeney | 425/405.1 |
| 4,204,822 | 5/1980 | Hewitt | 425/210 |
| 4,488,862 | 12/1984 | Epel et al. | 425/405.1 |
| 4,551,085 | 11/1985 | Epel et al. | 425/405.1 |
| 4,690,787 | 9/1987 | Fasnacht | 264/16 |
| 4,701,122 | 10/1987 | Reimche | 425/405.1 |
| 4,957,676 | 9/1990 | Greenwood | 425/405.1 |
| 5,196,206 | 3/1993 | Troia et al. | 425/405.1 |
| 5,496,433 | 3/1996 | Miyashita et al. | 156/358 |
| 5,776,407 | 7/1998 | Takeda | 425/405.1 |

FOREIGN PATENT DOCUMENTS 0338562  10/1989  European Pat. Off. .

OTHER PUBLICATIONS

Austrain Patent OfficeService and Information Sector, Search report, Examination report, Mar. 18, 1999, 6 pgs.

*Primary Examiner*—Harold Pyon
*Assistant Examiner*—Mark A. Wentink
*Attorney, Agent, or Firm*—McAulay Nissen Goldberg Kiel & Hand. LLP

[57] ABSTRACT

The apparatus and process to compensate for variations in thickness of molding tools and of moldable materials used in an embossing process to be carried out under a vacuum, while ensuring high dimensional stability, and to ensure different molding depths. For achieving this object, a chamber is employed having a pair of oppositely lying chamber parts, of which one is fixed to the framework and the other is adjustable, having side walls which comprise an inner part and an outer part. The inner part is fastened to the fixed chamber part and the outer part, on the outwardly facing end face to of which the adjustable chamber part comes to bear against the force of a spring during the closing of the chamber, is displaceable along guide elements on the fixed chamber part between two stops. Within the chamber there takes place a setting of atmospheric conditions and of temperature conditions at points in time of the closing of the chamber at which an increase in a force acting on the fixed chamber part reaches predetermined values. Apparatus and processes employing such chamber are used in the production of microsystem components

5 Claims, 3 Drawing Sheets

APPARATUS FOR MOLDING MICROSYSTEM STRUCTURES

BACKGROUND OF THE INVENTION a) Field of the Invention

The invention relates to the molding of microsystem structures with an apparatus which includes a pair of oppositely lying chamber parts of a closable chamber, which serve as carriers for receiving an embossing tool and a moldable material, and of which one chamber part is fixed to the framework and the other is guided adjustably in a frame.

b) Description of the Related Art

In the process for producing microsystem components which has become known under the name LIGA technique (a German acronym standing for lithography with synchrotron radiation, galvanoplating and plastic molding), the molding is a key to mass production. By pressing a molding tool into a layer of thermoplastic or some other material, preferably under a vacuum and at a temperature above the softening temperature of the thermoplastic, three-dimensional structures are produced with structure heights in the range of just a few nanometers to a few hundred micrometers.

DE 40 10 669 C1 and DE 42 22 856 C1, which relate to processes for producing microstructured elements from plastic, describe in detail the process steps of the so-called vacuum embossing process. The structural design of an apparatus suitable for molding on a mass-production scale is not dealt within detail.

Such an apparatus must meet the requirement of having flexible apparatus possibilities. This includes solving those problems which arise because of different heights of the molding tools to be used and also different thicknesses of the molding material and the molding depth (structure depth). This adaptability is additionally made more difficult by the requirement contained in DE 42 22 856 C1 for very accurate parallel guidance of the tool.

OBJECT AND SUMMARY OF THE INVENTION

The primary object of the invention is therefore to compensate for such variations in thickness in the embossing process to be carried out under a vacuum, while ensuring high dimensional stability, and to ensure different molding depths.

The object is achieved by an apparatus for molding microsystem structures having a pair of oppositely lying chamber parts of a closable chamber, which serve as carriers for receiving an embossing tool and a moldable material and of which one chamber part is fixed to the framework and the other is guided adjustably in a frame, in that the chamber has side walls which comprise an inner part and an outer part, and the inner part is fastened to the fixed chamber part and the outer part, on the outwardly facing end face of which the adjustable chamber part comes to bear against the force of a spring during the closing of the chamber, is displaceable along guide elements on the fixed chamber part between two stops. The spacing of the stops essentially determines the chamber width.

The inner part is formed by a first cylindrical flange, the widening of which is fastened to the fixed chamber part. The widening contains in a groove a round ring for sealing with respect to the fixed chamber part.

The outer part in the form of a second cylindrical flange encloses both the first flange with its inner lateral surface and, with bores in its widening, the guide elements, a vacuum-tight sliding connection being established between the first flange and the second flange by means of a square ring.

In spite of the displacement of the adjustable chamber part necessary during the process of molding and its preceding and following steps, the chamber remains in the closed state, with the result that process conditions which have been set are not changed.

The chamber is advantageously enclosed on all sides, at least in certain sections, by heat-insulating jackets, insulating plates being fitted on outwardly facing sides of the chamber parts and lateral heat radiation losses being reduced by heat-reflective annular plates in a staggered arrangement.

The invention also relates to a process for molding microsystem structures in which a moldable material is pressed by a molding force and for a predetermined period of time within a closable chamber into a molding tool by adjusting a movable chamber part against a fixed chamber part after setting atmospheric conditions and a molding temperature adapted to the molding material, and in which a removal of the molded material takes place at a demolding temperature. The setting of the atmospheric conditions and the process temperature takes place at points In time of the closing of the chamber at which an increase in the force acting on the fixed chamber part reaches predetermined values.

Thus, the setting of the atmospheric conditions begins at a first predetermined value of the force, at which a closure of the chamber has taken place by bringing the closable chamber part to bear against the outwardly facing end face of the outer part of the side walls.

The setting of the process temperature is dependent on a second predetermined value, at which the molding tool and the moldable material bear against each other In optimum thermal contact.

An increase in the force acting on the fixed chamber part caused by thermal expansion is advantageously compensated by a travel-regulated adjustment of the adjustable chamber part.

The invention is to be explained in more detail below with reference to the diagrammatic drawings.

DESCRIPTION OF THE PREFERRED EMBODIMENTS

Figure 1:
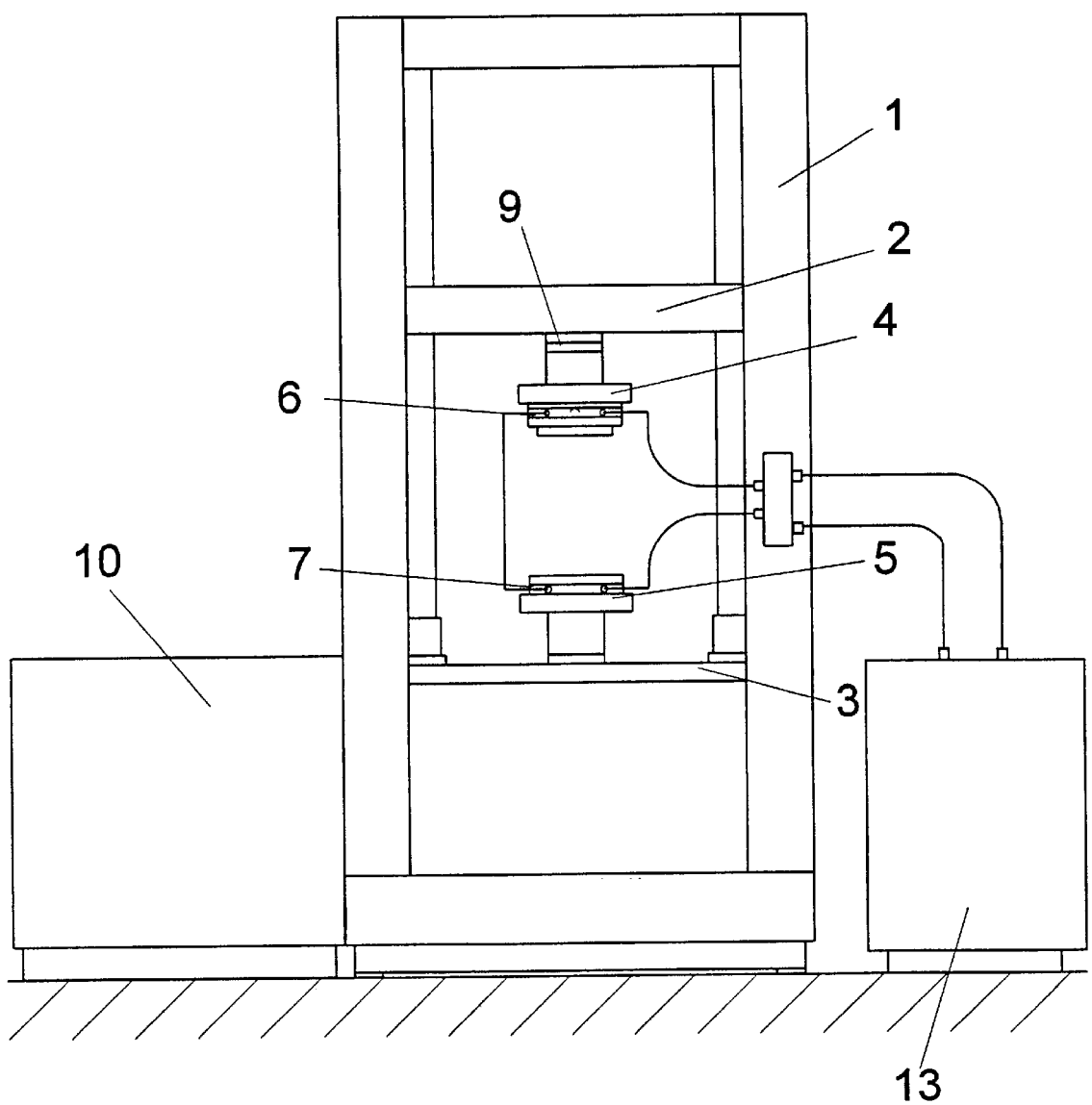
FIG. 1 shows the basic construction of a molding installation.

According to FIG. 1, a load frame 1 carries a part 2, which is fixed to the framework, and a part 3, which is adjustable, to which flanges 4, 5 are fastened. Both flanges 4, 5 serve for securing oppositely lying chamber parts 6, 7 of a vacuum chamber, which is represented in more detail in FIGS. 2 and 3.

With a combination of a motor, spindle and guide as a force-generating unit which is integrated in the load frame 1, the adjustable part 3 can be displaced against the fixed part 2 controllably in the force of the contact pressure, also involving the use of a device for force measurement 9, a control device 10 and devices which are not shown for measuring the travel and for regulating the force.

For increasing the temperature and for cooling during and after the thermoforming process, there is provided a temperature-control unit 13, operating with oil as the heat transfer medium.

Insulating plates 14, 15 between the flanges 4, 5 and the temperature-controllable chamber parts 6, 7 restrict any heat transfer to the neighboring components of the apparatus in an adequate way. Not shown are means for vacuum generation and monitoring, for venting and for temperature sensing.

Figure 2:
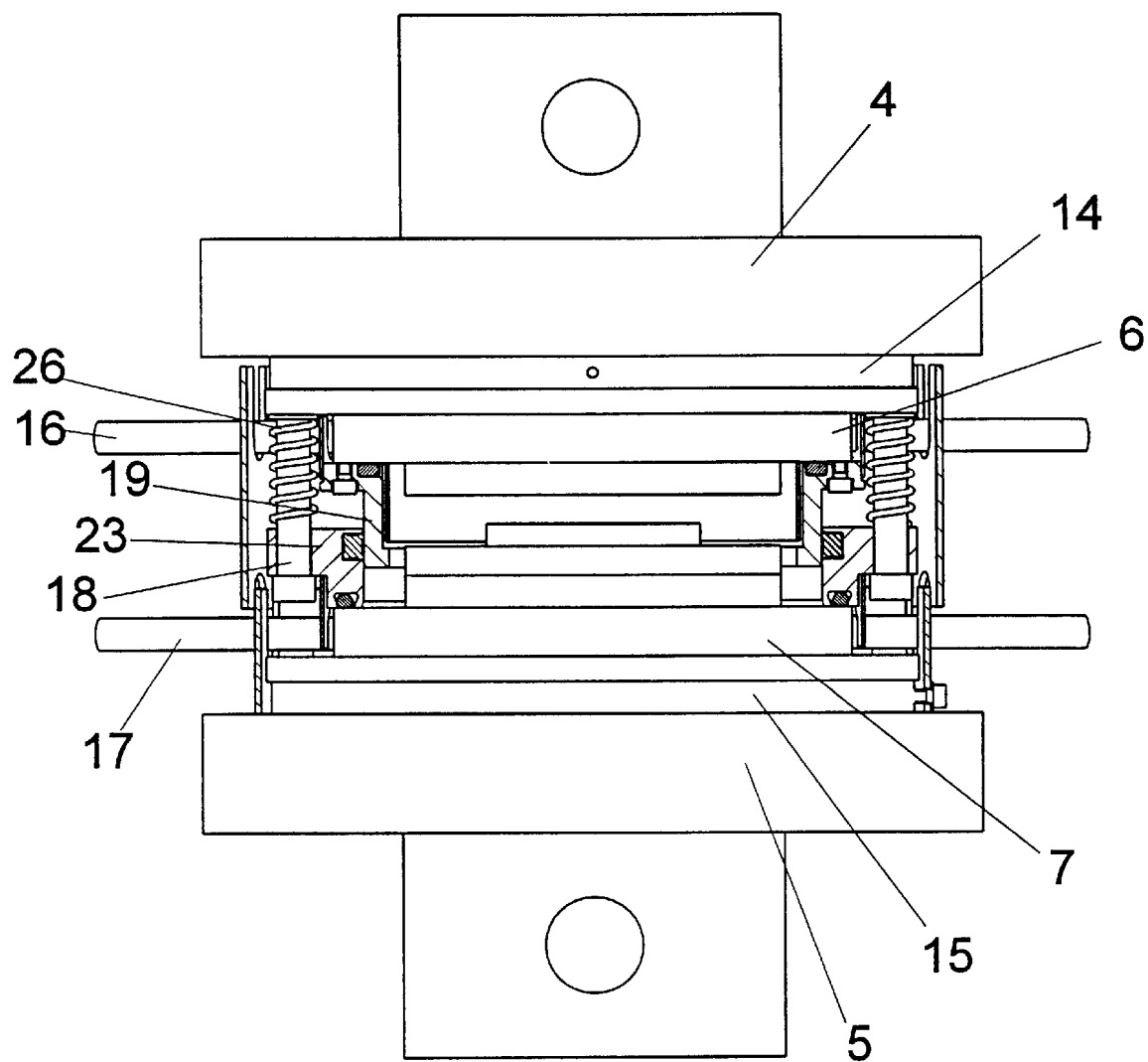
FIG. 2 shows a vacuum chamber serving for the molding.
Figure 3:
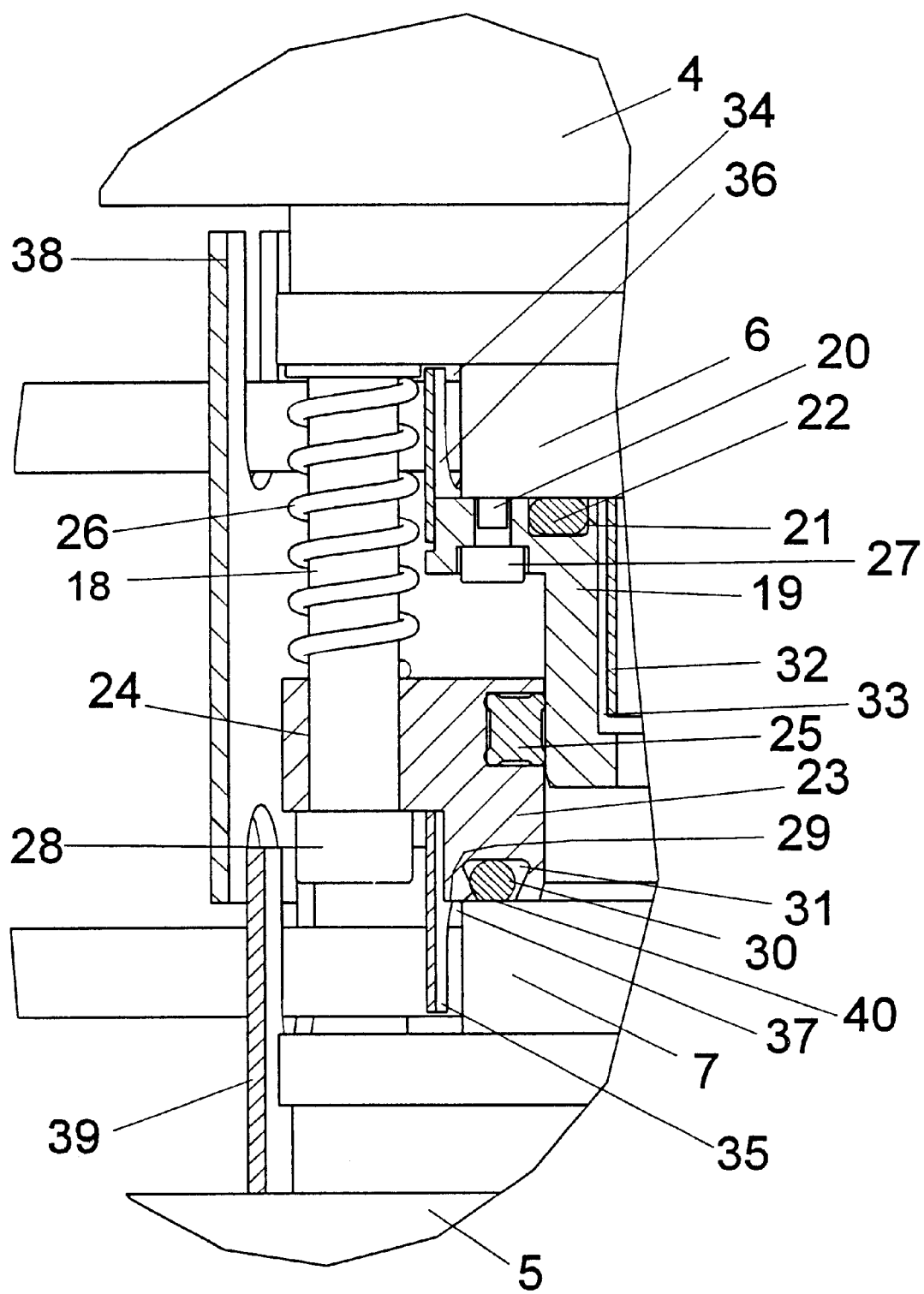
FIG. 3 shows means for the chamber height adjustment in an enlarged detail.

According to FIGS. 2 and 3, taken through the chamber parts 6, 7 are channels 16, 17, which are connected to the temperature-control unit 13.

The chamber part 6 is fastened to the flange 4 by means of six screws, which are passed through sleeves 18 and of which one or two can be seen, depending on the figure. (For the sake of overall clarity, in FIG. 2 not all the parts are provided with their reference numerals).

The side walls of the vacuum chamber are separated into an inner part and an outer part. The inner part is formed by a first cylindrical flange 19, the widening of which is fastened to the chamber part 7 by screws 20. For sealing, a round ring 22 is placed in a groove 21.

The outer part encloses in the form of a second cylindrical flange 23 both the first flange 19 with its inner lateral surface and, with bores 24 in its widening, the sleeves 18. A vacuum-tight sliding connection is established by means of a square ring 25. Pushed onto the sleeves 18, serving as a guide for the second flange 23, are compression springs 26, which bear against the widening of the second flange 23 and are supported against the chamber part 6.

Screw heads 27, 28 form limiting stops for a movement of the second flange 23, which is pressed against the screw heads 28 by the action of the compression springs 26 when the vacuum chamber is open and against the outwardly facing end face 29 of which the adjustable chamber part 7 comes to bear against the force of the compression spring 26 during the closing of the vacuum chamber. For scaling purposes, a zero ring 30 is placed into a groove 31 in the end face 29.

The inner space of the vacuum chamber, serving as a process space, is enclosed multiply by heat-reflective annular plates to reduce lateral heat radiation losses. A first inner plate 32 is arranged within the first flange 19 and leaves a gap 33 with respect to the latter. Middle plates 35, 36 are alongside the chamber parts 6, 7 on outwardly facing sides and leaving gaps 34, 37 free. Finally, outer plates 38, 39 form a final shield.

On one of the chamber parts 6, 7, serving as the upper part and lower part, there is provided a receptacle (not shown), with which a molding tool and/or an embossing die can be held in fixed installation or which is suitable for securing a structure of layers assembled outside the apparatus, comprising for example a molding tool, molding material, die and technologically required release films. Loading may take place both manually and automatically.

To avoid oxidation of the molding tool or air enclosures in the structures to be produced, not only a vacuum ambience but also the use of an inert gas are suitable for atmospheric conditions. The vacuum chamber described in the present example may also be designed, without changing the components essential for the invention, as a closable chamber in which it is possible to work under an inert gas atmosphere.

The bearing of a sealing surface 40 of the lower chamber part 7 against the zero ring 30 in the outwardly facing end face 29 during the closing of the vacuum chamber leads to an increase in a compressive force, measured by the force-measuring device 9. When a predetermined first force is reached, the movement of the adjustable part 3 is stopped, the position kept constant in a travel-regulated manner. An evacuation of the vacuum chamber takes place, without a force being exerted on the moldable material.

Once the evacuation has taken place, the process of molding begins. First of all, the device for force measurement 9 is zeroed, since the forces on the chamber which are generated by the vacuum after evacuation have no influence on the molding. The adjustable part 3 is then moved until a second force, which is again predetermined and at which the molding tool and the moldable material are in optimum contact with each other for temperature control, is reached. The fact that the second flange 23 slides over the first flange 19 means that the reduction in the chamber height necessary for this purpose is achieved, while retaining the vacuum conditions.

The molding tool and the moldable material are brought to the required molding temperature, the force set being kept constant by regulating the force. An increase in the force of the contact pressure, caused by thermal expansion of the materials, is compensated by means of the adjustable part 3, by regulating the travel.

The displaceability of the flange 23 with respect to the flange 19 means that the vacuum-tight closure of the vacuum chamber is ensured in an advantageous way in the case of this measure as well.

A stop on the screw heads 27 produces a measurable increase in the force measured by the measuring device 9, whereby the maximum displacement travel of the elements involved in the molding can be monitored.

Once the required molding temperature has been reached, the molding force necessary for the molding process is introduced via the adjustable part 3 and the molding process is controlled in a force-regulated manner.

Once the molding process has been completed, the adjustable part 3 is moved until a predetermined third force has been reached. Then, the molding tool and the molding die are cooled to a demolding temperature, by switching over the temperature-control regime by means of the temperature-controllable chamber parts 6, 7. Once this temperature has been reached, the vacuum chamber is flooded with inert gas and is opened by reversing the travel of the adjustable part 3. The action of the compression springs 26 has the effect that the second flange 23 is pressed against the screw heads 28, whereby the initial position with the greatest chamber width is reached.

While the foregoing description and drawings represent the preferred embodiments of the present invention, it will be obvious to those skilled in the art that various changes and modifications may be made therein without departing from the true spirit and scope of the present invention.

What is claimed is:

1. In an apparatus for molding microsystem structures having a pair of oppositely lying chamber parts of a closable chamber, which serve as carriers for receiving an embossing tool and a moldable material, and of which one chamber part is fixed to a frame and the other is guided adjustably in said frame, an improvement comprising that:

said chamber has side walls which are separated into an inner wall part and an outer wall part, said inner wall part and said outer wall part both being supported by said fixed chamber part;

said outer wall part has an outwardly facing axial end face on which the adjustable chamber part comes to bear against the force of a spring during closing of said chamber, and is movable relative to the inner wall part and displaceable in an adjustable direction towards and away from said fixed chamber part;

guide elements mounted on the fixed chamber part for guiding the displacement of said outer wall part in said adjustment direction between two stops, a first of which determining a maximal and the second of which determining a minimal distance between said outer wall part and said fixed chamber part, said guide elements also forming said first stop, said inner wall part is formed by a first cylindrical flange, and said outer wall part is formed by a second cylindrical flange enclosing the first cylindrical flange with an inner lateral surface and has a radial widening being provided with through bores, with said guide elements extending through said through bores which serve as a guide for said outer wall part during displacement.

2. Apparatus according to claim 1, wherein said first cylindrical flange comprises a widening portion which is fastened to the fixed chamber part and contains in a groove a round ring for sealing with respect to said fixed chamber part.

3. Apparatus according to claim 2, wherein said second cylindrical flange includes a square sealing ring located on said inner lateral surface, said square sealing ring establishing a vacuum-tight sliding connection between said first flange and said second flange.

4. Apparatus according to claim 3, further comprising heat insulators located adjacent said chamber for preventing heat loss from said chamber.

5. Apparatus according to claim 3, wherein further comprising insulating plates fitted on outwardly facing sides of the chamber parts and heat-reflective annular plates located within the chamber for reducing lateral heat radiation.

\* \* \* \* \*